(12) United States Patent
Long (10) Patent No.: US 11,307,664 B2
(45) Date of Patent: Apr. 19, 2022

(54) THREE-DIMENSIONAL PERCEPTIONS IN HAPTIC SYSTEMS

(71) Applicant: Ultrahaptics IP Ltd, Bristol (GB)

(72) Inventor: Benjamin John Oliver Long, Bristol (GB)

(73) Assignee: ULTRAHAPTICS IP LTD, Bristol (GB)

( * ) Notice: Subject to any disclaimer, the term of this patent is extended or adjusted under 35 U.S.C. 154(b) by 0 days.

(21) Appl. No.: 17/170,841

(22) Filed: Feb. 8, 2021

(65) Prior Publication Data

US 2021/0303072 A1 Sep. 30, 2021

Related U.S. Application Data

(63) Continuation of application No. 16/699,629, filed on Nov. 30, 2019, now Pat. No. 10,915,177, which is a
(Continued)

(51) Int. Cl.
*G06F 3/01* (2006.01)
*G06F 3/0488* (2022.01)
(Continued)

(52) U.S. Cl.
CPC ............. *G06F 3/016* (2013.01); *G06F 3/011* (2013.01); *G06F 3/017* (2013.01); *G06F 3/0416* (2013.01);
(Continued)

(58) Field of Classification Search
None
See application file for complete search history.

(56) References Cited

U.S. PATENT DOCUMENTS

| 4,218,921 A | 8/1980 | Berge |
| 4,771,205 A | 9/1988 | Mequio |

(Continued)

FOREIGN PATENT DOCUMENTS

| CA | 2470115 A1 | 6/2003 |
| CN | 101986787 | 3/2011 |

(Continued)

OTHER PUBLICATIONS

Notice of Allowance in U.S. Appl. No. 15/210,661 dated Jun. 17, 2020 (22 pages).

(Continued)

*Primary Examiner* — Christopher J Kohlman
(74) *Attorney, Agent, or Firm* — Koffsky Schwalb LLC; Mark I. Koffsky (57) ABSTRACT

An acoustic field may be produced from a transducer array having known relative positions and orientations. In this acoustic field, one or more control points may be defined. An amplitude may be assigned to the control point. Mid-air haptic effect for a virtual object on a human body part may be generated by moving the control point in a single closed curve comprising a plurality of curve segments. The single closed curve traverses at least one location where the human body part intersects with the virtual object. Additionally, a user may interact with virtual three-dimensional content using the user's hands while a tracking system monitoring the user's hands, a physics engine updates the properties of the virtual three-dimensional content and a haptic feedback system provides haptic information to the user.

5 Claims, 1 Drawing Sheet

Related U.S. Application Data continuation of application No. 16/296,127, filed on Mar. 7, 2019, now Pat. No. 10,496,175, which is a continuation of application No. 15/665,629, filed on Aug. 1, 2017, now Pat. No. 10,268,275.

(60) Provisional application No. 62/397,419, filed on Sep. 21, 2016, provisional application No. 62/370,865, filed on Aug. 4, 2016, provisional application No. 62/370,786, filed on Aug. 4, 2016, provisional application No. 62/370,522, filed on Aug. 3, 2016.

(51) Int. Cl.
*G06F 3/041* (2006.01)
*G06F 3/04815* (2022.01)
*G06F 3/16* (2006.01)

(52) U.S. Cl.
CPC ........ *G06F 3/0488* (2013.01); *G06F 3/04815* (2013.01); *G06F 3/16* (2013.01); *G06F 2203/04108* (2013.01); *G06F 2203/04809* (2013.01)

(56) References Cited

U.S. PATENT DOCUMENTS

| | | |
|---|---|---|
| 4,881,212 A | 11/1989 | Takeuchi |
| 5,226,000 A | 7/1993 | Moses |
| 5,243,344 A | 9/1993 | Koulopoulos |
| 5,329,682 A | 7/1994 | Thurn |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,859,915 A | 1/1999 | Norris |
| 6,029,518 A | 2/2000 | Oeftering |
| 6,193,936 B1 | 2/2001 | Gardner |
| 6,503,204 B1 | 1/2003 | Sumanaweera |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,182,726 B2 | 2/2007 | Williams |
| 7,225,404 B1 | 5/2007 | Zilles |
| 7,345,600 B1 | 3/2008 | Fedigan |
| 7,487,662 B2 | 2/2009 | Schabron |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,369,973 B2 | 2/2013 | Risbo |
| 8,607,922 B1 | 12/2013 | Werner |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,945,818 B2 | 4/2018 | Ganti |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,469,973 B2 | 11/2019 | Hayashi |
| 10,510,357 B2 | 12/2019 | Kovesi |
| 10,523,159 B2 | 12/2019 | Megretski |
| 10,569,300 B2 | 2/2020 | Hoshi |
| 2001/0033124 A1 | 10/2001 | Norris |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0212760 A1 | 9/2005 | Marvit |
| 2005/0267695 A1 | 12/2005 | German |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0094317 A1 | 4/2007 | Wang |
| 2007/0177681 A1 | 8/2007 | Choi |
| 2007/0263741 A1 | 11/2007 | Erving |
| 2008/0012647 A1 | 1/2008 | Risbo |
| 2008/0084789 A1 | 4/2008 | Altman |
| 2008/0130906 A1 | 6/2008 | Goldstein |
| 2008/0273723 A1 | 11/2008 | Hartung |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Vitek |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | McElveen |
| 2013/0173658 A1 | 7/2013 | Adelman |
| 2014/0027201 A1 | 1/2014 | Islam |
| 2014/0104274 A1 | 4/2014 | Hilliges |

(56) References Cited

U.S. PATENT DOCUMENTS

| | | | |
|---|---|---|---|
| 2014/0139071 A1 | 5/2014 | Yamamoto | |
| 2014/0168091 A1 | 6/2014 | Jones | |
| 2014/0204002 A1 | 7/2014 | Bennet | |
| 2014/0265572 A1 | 9/2014 | Siedenburg | |
| 2014/0269207 A1 | 9/2014 | Baym | |
| 2014/0269208 A1 | 9/2014 | Baym | |
| 2015/0002477 A1 | 1/2015 | Cheatham, III | |
| 2015/0005039 A1 | 1/2015 | Liu | |
| 2015/0006645 A1 | 1/2015 | Oh | |
| 2015/0007025 A1 | 1/2015 | Sassi | |
| 2015/0013023 A1 | 1/2015 | Wang | |
| 2015/0066445 A1 | 3/2015 | Lin | |
| 2015/0070147 A1 | 3/2015 | Cruz-Hernandez | |
| 2015/0070245 A1 | 3/2015 | Han | |
| 2015/0078136 A1 | 3/2015 | Sun | |
| 2015/0081110 A1 | 3/2015 | Houston | |
| 2015/0110310 A1 | 4/2015 | Minnaar | |
| 2015/0130323 A1 | 5/2015 | Harris | |
| 2015/0168205 A1 | 6/2015 | Lee | |
| 2015/0192995 A1* | 7/2015 | Subramanian | G06F 3/011 340/407.1 |
| 2015/0220199 A1 | 8/2015 | Wang | |
| 2015/0226537 A1 | 8/2015 | Schorre | |
| 2015/0226831 A1 | 8/2015 | Nakamura | |
| 2015/0248787 A1 | 9/2015 | Abovitz | |
| 2015/0258431 A1 | 9/2015 | Stafford | |
| 2015/0277610 A1 | 10/2015 | Kim | |
| 2015/0304789 A1 | 10/2015 | Babayoff | |
| 2015/0323667 A1 | 11/2015 | Przybyla | |
| 2015/0331576 A1 | 11/2015 | Piya | |
| 2015/0332075 A1 | 11/2015 | Burch | |
| 2016/0019762 A1 | 1/2016 | Levesque | |
| 2016/0019879 A1 | 1/2016 | Daley | |
| 2016/0026253 A1 | 1/2016 | Bradski | |
| 2016/0044417 A1 | 2/2016 | Clemen, Jr. | |
| 2016/0124080 A1 | 5/2016 | Carter | |
| 2016/0138986 A1 | 5/2016 | Carlin | |
| 2016/0175701 A1 | 6/2016 | Froy | |
| 2016/0175709 A1 | 6/2016 | Idris | |
| 2016/0189702 A1 | 6/2016 | Blanc | |
| 2016/0242724 A1 | 8/2016 | Lavallee | |
| 2016/0246374 A1 | 8/2016 | Carter | |
| 2016/0249150 A1 | 8/2016 | Carter | |
| 2016/0291716 A1 | 10/2016 | Boser | |
| 2016/0306423 A1 | 10/2016 | Uttermann | |
| 2016/0320843 A1 | 11/2016 | Long | |
| 2016/0339132 A1 | 11/2016 | Cosman | |
| 2016/0374562 A1 | 12/2016 | Vertikov | |
| 2017/0002839 A1 | 1/2017 | Bukland | |
| 2017/0004819 A1 | 1/2017 | Ochiai | |
| 2017/0018171 A1 | 1/2017 | Carter | |
| 2017/0052148 A1 | 2/2017 | Estevez | |
| 2017/0123487 A1 | 5/2017 | Hazra | |
| 2017/0123499 A1 | 5/2017 | Eid | |
| 2017/0140552 A1 | 5/2017 | Woo | |
| 2017/0144190 A1 | 5/2017 | Hoshi | |
| 2017/0181725 A1 | 6/2017 | Han | |
| 2017/0193768 A1 | 7/2017 | Long | |
| 2017/0193823 A1 | 7/2017 | Jiang | |
| 2017/0211022 A1 | 7/2017 | Reinke | |
| 2017/0336860 A1 | 11/2017 | Smoot | |
| 2018/0039333 A1 | 2/2018 | Carter | |
| 2018/0074580 A1 | 3/2018 | Hardee | |
| 2018/0081439 A1 | 3/2018 | Daniels | |
| 2018/0139557 A1 | 5/2018 | Ochiai | |
| 2018/0146306 A1 | 5/2018 | Benattar | |
| 2018/0151035 A1 | 5/2018 | Maalouf | |
| 2018/0166063 A1 | 6/2018 | Long | |
| 2018/0190007 A1 | 7/2018 | Panteleev | |
| 2018/0304310 A1 | 10/2018 | Long | |
| 2018/0309515 A1 | 10/2018 | Murakowski | |
| 2018/0310111 A1 | 10/2018 | Kappus | |
| 2018/0350339 A1 | 12/2018 | Macours | |
| 2018/0361174 A1 | 12/2018 | Radulescu | |
| 2019/0038496 A1 | 2/2019 | Levesque | |
| 2019/0091565 A1 | 3/2019 | Nelson | |
| 2019/0175077 A1 | 6/2019 | Zhang | |
| 2019/0187244 A1 | 6/2019 | Riccardi | |
| 2019/0196578 A1 | 6/2019 | Iodice | |
| 2019/0197840 A1 | 6/2019 | Kappus | |
| 2019/0197842 A1 | 6/2019 | Long | |
| 2019/0235628 A1 | 8/2019 | Lacroix | |
| 2020/0080776 A1 | 3/2020 | Kappus | |

FOREIGN PATENT DOCUMENTS

| | | |
|---|---|---|
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| EP | 309003 | 3/1989 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 | 3/2012 |
| JP | 2015035657 A | 2/2015 |
| JP | 2016035646 | 3/2016 |
| KR | 20120065779 | 6/2012 |
| KR | 20130055972 | 5/2013 |
| KR | 20160008280 | 1/2016 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2014181084 A1 | 11/2014 |
| WO | 2015006467 | 1/2015 |
| WO | 2015039622 | 3/2015 |
| WO | 2015127335 | 8/2015 |
| WO | 2016007920 | 1/2016 |
| WO | 2016095033 A1 | 6/2016 |
| WO | 2016099279 | 6/2016 |
| WO | 2016132144 | 8/2016 |
| WO | 2016137675 | 9/2016 |
| WO | 2016162058 | 10/2016 |
| WO | 2017172006 | 10/2017 |
| WO | 2020049321 A2 | 3/2020 |

OTHER PUBLICATIONS

Kolb, et al., "Time-of-Flight Cameras in Computer Graphics," Computer Graphics forum, vol. 29 (2010), No. 1, pp. 141-159.

Iddan, et al., "3D Imaging in the Studio (and Elsewhwere . . . " Apr. 2001, 3DV systems Ltd., Yokneam, Isreal, www.3dvsystems.com.il, 9 pages.

EPO Office Action for EP16708440.9 dated Sep. 12, 2018 (7 pages).

Search report for PCT/GB2018/051061 dated Sep. 26, 2018 (17 pages).

Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.

Search Report for GB1308274.8 dated Nov. 11, 2013. (2 pages).

(56) References Cited

OTHER PUBLICATIONS

Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Search Report for GB1415923.0 dated Mar. 11, 2015. (1 page).
Search Report for PCT/GB/2017/053880 dated Mar. 21, 2018. (13 pages).
Search report and Written Opinion of ISA for PCT/GB2017/050012 dated Jun. 8, 2017. (18 pages).
Iwamoto T et al, "Two-dimensional Scanning Tactile Display using Ultrasound Radiation Pressure", Haptic Interfaces for Virtual Environment and Teleoperator Systems, 20 06 14th Symposium on Alexandria, VA, USA Mar. 25-26, 2006, Piscataway, NJ, USA,IEEE, (Mar. 25, 2006), ISBN 978-1-4244-0226-7, pp. 57-61.
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Oscar Martínez-graullera et al, "2D array design based on Fermat spiral for ultrasound imaging", ultrasonics, (Feb. 1, 2010), vol. 50, No. 2, ISSN 0041-624X, pp. 280-289, XP055210119.
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
Hoshi T et al, "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
E. Bok, Metasurface for Water-to-Air Sound Transmission, Physical Review Letters 120, 044302 (2018) (6 pages).
Tom Nelligan and Dan Kass, Intro to Ultrasonic Phased Array (date unknown) (8 pages).
Sylvia Gebhardt, Ultrasonic Transducer Arrays for Particle Manipulation (date unknown) (2 pages).
K. Jia, Dynamic properties of micro-particles in ultrasonic transportation using phase-controlled standing waves, J. Applied Physics 116, n. 16 (2014) (12 pages).
Search Report for PCT/GB/2017/053729 dated Mar. 15, 2018 (16 pages).
Search Report for PCT/GB2017/052332 dated Oct. 10, 2017 (12 pages).
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Pompei, F.J. (2002), "Sound from Ultrasound: The Parametric Array as an Audible Sound Source", Massachusetts Institute of Technology (132 pages).
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Yoshino, K. and Shinoda, H. (2013), "Visio Acoustic Screen for Contactless Touch Interface with Tactile Sensation", University of Tokyo (5 pages).
Kamakura, T. and Aoki, K. (2006) "A Highly Directional Audio System using a Parametric Array in Air" Wespac IX 2006 (8 pages).
Alexander, J. et al. (2011), Adding Haptic Feedback to Mobile TV (6 pages).
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015 (12 pages).
Search report for PCT/GB2014/051319 dated Dec. 8, 2014 (4 pages).
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Obrist et al., Talking about Tactile Experiences, CHI 2013, Apr. 27-May 2, 2013 (10 pages).
Freeman et al., Tactile Feedback for Above-Device Gesture Interfaces: Adding Touch to Touchless Interactions ICMI'14, Nov. 12-16, 2014, Istanbul, Turkey (8 pages).
Obrist et al., Emotions Mediated Through Mid-Air Haptics, CHI 2015, Apr. 18-23, 2015, Seoul, Republic of Korea. (10 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Phys.org, Touchable Hologram Becomes Reality, Aug. 6, 2009, by Lisa Zyga (2 pages).
Iwamoto et al., Airborne Ultrasound Tactile Display: Supplement, The University of Tokyo 2008 (2 pages).
Hoshi, T., Development of Aerial-Input and Aerial-Tactile-Feedback System, IEEE World Haptics Conference 2011, p. 569-573.
EPSRC Grant summary EP/J004448/1 (2011) (1 page).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Light, E.D., Progress in Two Dimensional Arrays for Real Time Volumetric Imaging, 1998 (17 pages).
Casper et al., Realtime Control of Multiple-focus Phased Array Heating Patterns Based on Noninvasive Ultrasound Thermography, IEEE Trans Biomed Eng. Jan. 2012; 59(1): 95-105.
Hoshi, T., Touchable Holography, SIGGRAPH 2009, New Orleans, Louisiana, Aug. 3-7, 2009. (1 page).
Search report for PCT/US2018/028966 dated Jul. 13, 2018 (43 pages).
Marzo et al., Holographic acoustic elements for manipulation of levitated objects, Nature Communications DOI: 10.1038/ncomms9661 (2015) (7 pages).

(56) References Cited

OTHER PUBLICATIONS

A. Sand, Head-Mounted Display with Mid-Air Tactile Feedback, Proceedings of the 21st ACM Symposium on Virtual Reality Software and Technology, Nov. 13-15, 2015 (8 pages).
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Notice of Allowance dated Dec. 19, 2018 for U.S. Appl. No. 15/665,629 (pp. 1-9).
"Welcome to Project Soli" video, https://atap.google.com/#project-soli Accessed Nov. 30, 2018, 2 pages.
Sixth Sense webpage, http://www.pranavmistry.com/projects/sixthsense/Accessed Nov. 30, 2018, 7 pages.
Damn Geeky, "Virtual projection keyboard technology with haptic feedback on palm of your hand," May 30, 2013, 4 pages.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Li, Larry, "Time-of-Flight Camera—An Introduction," Texas Instruments, Technical White Paper, SLOA190B—Jan. 2014 Revised May 2014, 10 pages.
Zeng, Wejun, "Microsoft Kinect Sensor and Its Effect," IEEE Multimedia, Apr.-Jun. 2012, 7 pages.
Krim, et al., "Two Decades of Array Signal Processing Research—The Parametric Approach", IEEE Signal Processing Magazine, Jul. 1996, pp. 67-94.
Schmidt, Ralph, "Multiple Emitter Location and Signal Parameter Estimation" IEEE Transactions of Antenna and Propagation, vol. AP-34, No. 3, Mar. 1986, pp. 276-280.
Meijster, A., et al., "A General Algorithm for Computing Distance Transforms in Linear Time," Mathematical Morphology and its Applications to Image and Signal Processing, 2002, pp. 331-340.
Colgan, A., "How Does the Leap Motion Controller Work?" Leap Motion, Aug. 9, 2014, 10 pages.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
Notice of Allowance dated Dec. 21, 2018 for U.S. Appl. No. 15/983,864 (pp. 1-7).
Ex Parte Quayle Action dated Dec. 28, 2018 for U.S. Appl. No. 15/966,213 (pp. 1-7).
International Preliminary Report on Patentability and Written Opinion issued in corresponding PCT/US2017/035009, dated Dec. 4, 2018, 8 pages.
Notice of Allowance dated Feb. 7, 2019 for U.S. Appl. No. 15/851,214 (pp. 1-7).
Office Action dated Feb. 20, 2019 for U.S. Appl. No. 15/623,516 (pp. 1-8).
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
PCT Partial International Search Report for Application No. PCT/GB2018/053404 dated Feb. 25, 2019, 13 pages.
International Preliminary Report on Patentability for Application No. PCT/EP2017/069569 dated Feb. 5, 2019, 11 pages.
Office Action dated Apr. 4, 2019 for U.S. Appl. No. 15/897,804 (pp. 1-10).
Steve Guest et al., "Audiotactile interactions in roughness perception", Exp. Brain Res (2002) 146:161-171, DOI 10.1007/s00221-002-1164-z, Received: Feb. 9, 2002/Accepted: May 16, 2002/Published online: Jul. 26, 2002, Springer-Verlag 2002, (11 pages).
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
International Search Report and Written Opinion for Application No. PCT/GB2018/053738, dated Apr. 11, 2019, 14 pages.
Partial International Search Report for Application No. PCT/GB2018/053735, dated Apr. 12, 2019, 14 pages.
Office Action dated Apr. 18, 2019 for U.S. Appl. No. 16/296,127 (pags 1-6).
Japanese Office Action (with English language translation) for Application No. 2017-514569, dated Mar. 31, 3019, 10 pages.
Office Action dated May 16, 2019 for U.S. Appl. No. 15/396,851 (pp. 1-7).
Notice of Allowance dated May 30, 2019 for U.S. Appl. No. 15/966,213 (pp. 1-9).
International Search Report and Written Opinion for Application No. PCT/GB2018/053739, dated Jun. 4, 2019, 16 pages.
Corrected Notice of Allowability dated Jun. 21, 2019 for U.S. Appl. No. 15/966,213 (2 pages).
Office Action dated Jul. 10, 2019 for U.S. Appl. No. 15/210,661 (pp. 1-12).
Notice of Allowance dated Jul. 31, 2019 for U.S. Appl. No. 15/851,214 (pp. 1-9).
Office Action dated Jul. 26, 2019 for U.S. Appl. No. 16/159,695 (pp. 1-8).
Notice of Allowance dated Jul. 31, 2019 for U.S. Appl. No. 16/296,127 (pp. 1-9).
Office Action dated Aug. 22, 2019 for U.S. Appl. No. 16/160,862 (pp. 1-5).
International Search Report and Written Opinion for Application No. PCT/GB2019/051223, dated Aug. 8, 2019, 15 pages.
International Search Report and Written Opinion for Application No. PCT/GB2019/050969, dated Jun. 13, 2019, 15 pages.
Extended European Search Report for Application No. EP19169929.7, dated Aug. 6, 2019, 7 pages.
Office Action dated Oct. 7, 2019 for U.S. Appl. No. 15/396,851 (pp. 1-9).
Office Action dated Oct. 17, 2019 for U.S. Appl. No. 15/897,804 (pp. 1-10).
Corrected Notice of Allowability dated Oct. 31, 2019 for U.S. Appl. No. 15/623,516 (pp. 1-2).
Office Action dated Oct. 31, 2019 for U.S. Appl. No. 15/671,107 (pp. 1-6).
European Office Action for Application No. EP16750992.6, dated Oct. 2, 2019, 3 pages.
Office Action dated Dec. 11, 2019 for U.S. Appl. No. 15/959,266 (pp. 1-15).
Jager et al., "Air-Coupled 40-KHZ Ultrasonic 2D-Phased Array Based on a 3D-Printed Waveguide Structure", 2017 IEEE, 4 pages.
Wooh et al., "Optimum beam steering of linear phased arays," Wave Motion 29 (1999) pp. 245-265, 21 pages.
Canada Application 2,909,804 Office Action dated Oct. 18, 2019, 4 pages.
Search report for PCT/GB2015/052507 dated Mar. 11, 2020 (19 pages).
Notice of Allowance dated Feb. 10, 2020, for U.S. Appl. No. 16/160,862 (pp. 1-9).
Office Action dated Mar. 20, 2020 for U.S. Appl. No. 15/210,661 (pp. 1-10).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 29, 2020 for U.S. Appl. No. 16/198,959 (p. 1-6).
Office Action dated Jan. 10, 2020 for U.S. Appl. No. 16/228,767 (pp. 1-6).

(56) References Cited

OTHER PUBLICATIONS

Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Ashish Shrivastava et al., Learning from Simulated and Unsupervised Images through Adversarial Training, Jul. 19, 2017, pp. 1-16.
Konstantinos Bousmalis et al., Domain Separation Networks, 29th Conference on Neural Information Processing Sysgtems (NIPS 2016), Barcelona, Spain. Aug. 22, 2016, pp. 1-15.
Eric Tzeng et al., Adversarial Discriminative Domain Adaptation, Feb. 17, 2017, pp. 1-10.
David Joseph Tan et al., Fits like a Glove: Rapid and Reliable Hand Shape Personalization, 2016 IEEE Conference on Computer Vision and Pattern Recognition, pp. 5610-5619.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
GitHub—IntelRealSense/hand_tracking_samples: researc codebase for depth-based hand pose estimation using dynamics based tracking and CNNs, Mar. 26, 2020, 3 pages.
Stan Melax et al., Dynamics Based 3D Skeletal Hand Tracking, May 22, 2017, pp. 1-8.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Sergey Ioffe et al., Batch Normalization: Accelerating Deep Network Training by Reducing Internal Covariat Shift, Mar. 2, 2015, pp. 1-11.
Diederik P. Kingma et al., Adam: A Method for Stochastic Optimization, Jan. 30, 2017, pp. 1-15.
Christoper M. Bishop, Pattern Recognition and Machine Learning, 2006, pp. 1-758.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Mahdi Rad et al., Feature Mapping for Learning Fast and Accurate 3D Pose Inference from Synthetic Images, Mar. 26, 2018, pp. 1-14.
Jonathan Tompson et al., Real-Time Continuous Pose Recovery of Human Hands Using Convolutional Networks, ACM Trans. Graph. 33, 5, Article 169, Aug. 2014, pp. 1-10.
Vincent Lepetit et al., Model Based Augmentation and Testing of an Annotated Hand Pose Dataset, ResearchGate, https://www.researchgate.net/publication/307910344, Sep. 2016, 13 pages.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
GitHub—danfis/libccd: Library for collision detection between two convex shapes, Mar. 26, 2020, pp. 1-6.

OGRECave/ogre—GitHub: ogre/Samples/Media/materials at 7de80a7483f20b50f2b10d7ac6de9d9c6c87d364, Mar. 26, 2020, 1 page.
Shanxin Yuan et al., BigHand2.2M Bechmark: Hand Pose Dataset and State of the Art Analysis, Dec. 9, 2017, pp. 1-9.
Search report for PCT/GB2015/052916 dated Feb. 26, 2020 (18 pages).
Office Action dated Apr. 8, 2020, for U.S. Appl. No. 16/198,959 (pp. 1-17).
Office Action dated Apr. 29, 2020 for U.S. Appl. No. 16/374,301 (pp. 1-18).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 (Year: 2010), 20 pages.
Office Action dated Apr. 28, 2020 for U.S. Appl. No. 15/396,851 (pp. 1-12).
Office Action dated Apr. 16, 2020 for U.S. Appl. No. 15/839,184 (pp. 1-8).
Notice of Allowance dated Apr. 22, 2020 for U.S. Appl. No. 15/671,107 (pp. 1-5).
Office Action dated Apr. 17, 2020 for U.S. Appl. No. 16/401,148 (pp. 1-15).
Hua J, Qin H., Haptics-based dynamic implicit solid modeling, IEEE Trans Vis Comput Graph. Sep.-Oct. 2004;10(5):574-86.
Takayuki et al., "Noncontact Tactile Display Based on Radiation Pressure of Airborne Ultrasound" IEEE Transactions on Haptics vol. 3, No. 3, p. 165 (2010).
Hilleges et al. Interactions in the air: adding further depth to interactive tabletops, UIST '09: Proceedings of the 22nd annual ACM symposium on User interface software and technologyOct. 2009 pp. 139-148.
International Search Report and Written Opinion for Application No. PCT/GB2019/052510, dated Jan. 14, 2020, 25 pages.
Office Action dated May 18, 2020 for U.S. Appl. No. 15/960,113 (pp. 1-21).
Optimal regularisation for acoustic source reconstruction by inverse methods, Y. Kim, P.A. Nelson, Institute of Sound and Vibration Research, University of Southampton, Southampton, SO17 1BJ, UK Received Feb. 25, 2003; 25 pages.
Notice of Allowance dated Jun. 17, 2020 for U.S. Appl. No. 15/210,661 (pp. 1-9).
Partial ISR for Application No. PCT/GB2020/050013 dated May 19, 2020 (16 pages).
Office Action dated Jun. 19, 2020 for U.S. Appl. No. 16/699,629 (pp. 1-12).
Notice of Allowance dated Oct. 6, 2020 for U.S. Appl. No. 16/699,629 (pp. 1-8).
Office Action dated Jun. 25, 2020 for U.S. Appl. No. 16/228,767 (pp. 1-27).
Office Action dated Jul. 9, 2020 for U.S. Appl. No. 16/228,760 (pp. 1-17).
ISR and WO for PCT/GB2020/050926 (Jun. 2, 2020) (16 pages).
Mueller, GANerated Hands for Real-Time 3D Hand Tracking from Monocular RGB, Eye in-Painting with Exemplar Generative Adverserial Networks, pp. 49-59 (Jun. 1, 2018).
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
ISR and WO for PCT/GB2020/050013 (Jul. 13, 2020) (20 pages).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Notice of Allowance dated Sep. 30, 2020 for U.S. Appl. No. 16/401,148 (pp. 1-10).

(56) References Cited

OTHER PUBLICATIONS

Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Teixeira, et al., "A brief introduction to Microsoft's Kinect Sensor," Kinect, 26 pages, retrieved Nov. 2018.
Georgiou et al., Haptic in-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
Large et al.,Feel the noise: Mid-air ultrasound haptics as a novel human-vehicle interaction paradigm, Applied Ergonomics (2019) (10 pages).
Rocchesso et al., Accessing and Selecting Menu Items by In-Air Touch, ACM CHItaly'19, Sep. 23-25, 2019, Padova, Italy (9 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Imaginary Phone: Learning Imaginary Interfaces by Transferring Spatial Memory From a Familiar Device Sean Gustafson, Christian Holz and Patrick Baudisch. UIST 2011. (10 pages).
Office Action dated Dec. 7, 2020 for U.S. Appl. No. 16/563,608 (pp. 1-8).
Corrected Notice of Allowability dated Jan. 14, 2021 for U.S. Appl. No. 15/897,804 (pp. 1-2).
Office Action dated Mar. 11, 2021 for U.S. Appl. No. 16/228,767 (pp. 1-23).
Aoki et al., Sound location of stero reproduction with parametric loudspeakers, Applied Acoustics 73 (2012) 1289-1295 (7 pages).
Search Report by EPO for EP 17748466 dated Jan. 13, 2021 (16 pages).
Wang et al., Device-Free Gesture Tracking Using Acoustic Signals, ACM MobiCom '16, pp. 82-94 (13 pages).
ISR and WO for PCT/GB2020/052829 (Feb. 1, 2021) (15 pages).
Bortoff et al., Pseudolinearization of the Acrobot using Spline Functions, IEEE Proceedings of the 31st Conference on Decision and Control, Sep. 10, 1992 (6 pages).
ISR and WO for PCT/GB2020/052545 (Jan. 27, 2021) (14 pages).
ISR and WO for PCT/GB2020/052544 (Dec. 18, 2020) (14 pages).
Bajard et al., Evaluation of Complex Elementary Functions / A New Version of BKM, SPIE Conference on Advanced Signal Processing, Jul. 1999 (8 pages).
Bajard et al., BKM: A New Hardware Algorithm for Complex Elementary Functions, 8092 IEEE Transactions on Computers 43 (1994) (9 pages).
Office Action dated Mar. 31, 2021 for U.S. Appl. No. 16/228,760 (pp. 1-21).
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Hoshi et al.,Tactile Presentation by Airborne Ultrasonic Oscillator Array, Proceedings of Robotics and Mechatronics Lecture 2009, Japan Society of Mechanical Engineers; May 24, 2009 (5 pages).
ISR & WO for PCT/GB2020/052545 (Jan. 27, 2021) 14 pages.
ISR for PCT/GB2020/052546 (Feb. 23, 2021) (14 pages).
ISR for PCT/GB2020/053373 (Mar. 26, 2021) (16 pages).
Notice of Allowance dated Apr. 20, 2021 for U.S. Appl. No. 16/563,608 (pp. 1-5).
Notice of Allowance dated Jun. 10, 2021 for U.S. Appl. No. 17/092,333 (pp. 1-9).
Notice of Allowance dated Jun. 25, 2021 for U.S. Appl. No. 15/396,851 (pp. 1-10).
Office Action dated Jun. 25, 2021 for U.S. Appl. No. 16/899,720 (pp. 1-5).
Office Action dated May 13, 2021 for U.S. Appl. No. 16/600,500 (pp. 1-9).
Office Action dated May 14, 2021 for U.S. Appl. No. 16/198,959 (pp. 1-6).
A. B. Vallbo, Receptive field characteristics of tactile units with myelinated afferents in hairy skin of human subjects, Journal of Physiology (1995), 483.3, pp. 783-795.
Amanda Zimmerman, The gentle touch receptors of mammalian skin, Science, Nov. 21, 2014, vol. 346 Issue 6212, p. 950.
Corrected Notice of Allowability dated Aug. 9, 2021 for U.S. Appl. No. 15/396,851 (pp. 1-6).
Henrik Bruus, Acoustofluidics 2: Perturbation theory and ultrasound resonance modes, Lab Chip, 2012, 12, 20-28.
Hyunjae Gil, Whiskers: Exploring the Use of Ultrasonic Haptic Cues on the Face, CHI 2018, Apr. 21-26, 2018, Montréal, QC, Canada.
India Morrison, The skin as a social organ, Exp Brain Res (2010) 204:305-314.
JonasChatel-Goldman, Touch increases autonomic coupling between romantic partners, Frontiers in Behavioral Neuroscience Mar. 2014, vol. 8, Article 95.
Kai Tsumoto, Presentation of Tactile Pleasantness Using Airborne Ultrasound, 2021 IEEE World Haptics Conference (WHC) Jul. 6-9, 2021. Montreal, Canada.
Keisuke Hasegawa, Electronically steerable ultrasound-driven long narrow air stream, Applied Physics Letters 111, 064104 (2017).
Keisuke Hasegawa, Midair Ultrasound Fragrance Rendering, IEEE Transactions on Visualization and Computer Graphics, vol. 24, No. 4, Apr. 2018 1477.
Keisuke Hasegawa,,Curved acceleration path of ultrasound-driven air flow, J. Appl. Phys. 125, 054902 (2019).
Line S Loken, Coding of pleasant touch by unmyelinated afferents in humans, Nature Neuroscience vol. 12 [ No. 5 [ May 2009 547.
Mariana von Mohr, The soothing function of touch: affective touch reduces feelings of social exclusion, Scientific Reports, 7: 13516, Oct. 18, 2017.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Notice of Allowance dated Jul. 22, 2021 for U.S. Appl. No. 16/600,500 (pp. 1-9).
Office Action dated Aug. 10, 2021 for U.S. Appl. No. 16/564,016 (pp. 1-14).
Office Action dated Aug. 9, 2021 for U.S. Appl. No. 17/068,825 (pp. 1-9).
Office Action dated Sep. 16, 2021 for U.S. Appl. No. 16/600,496 (pp. 1-8).
Office Action dated Sep. 24, 2021 for U.S. Appl. No. 17/080,840 (pp. 1-9).
Rochelle Ackerley, Human C-Tactile Afferents Are Tuned to the Temperature of a Skin-Stroking Caress, J. Neurosci., Feb. 19, 2014, 34(8):2879-2883.
Ryoko Takahashi, Tactile Stimulation by Repetitive Lateral Movement of Midair Ultrasound Focus, Journal of Latex Class Files, vol. 14, No. 8, Aug. 2015.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Takaaki Kamigaki, Noncontact Thermal and Vibrotactile Display Using Focused Airborne Ultrasound, EuroHaptics 2020, LNCS 12272, pp. 271-278, 2020.
Tomoo Kamakura, Acoustic streaming induced in focused Gaussian beams, J. Acoust. Soc. Am. 97(5), Pt. 1, May 1995 p. 2740.

(56) References Cited

OTHER PUBLICATIONS

Uta Sailer, How Sensory and Affective Attributes Describe Touch Targeting C-Tactile Fibers, Experimental Psychology (2020), 67(4), 224 236.
EPO Examination Search Report 17 702 910.5 (dated Jun. 23, 2021).
Office Action dated Oct. 29, 2021 for U.S. Appl. No. 16/198,959 (pp. 1-7).
Notice of Allowance dated Nov. 5, 2021 for U.S. Appl. No. 16/899,720 (pp. 1-9).
Corrected Notice of Allowability dated Nov. 24, 2021 for U.S. Appl. No. 16/600,500 (pp. 1-5).
International Search Report and Written Opinion for App. No. PCT/GB2021/051590, dated Nov. 11, 2021, 20 pages.
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Office Action (Non-Final Rejection) dated Dec. 20, 2021 for U.S. Appl. No. 17/195,795 (pp. 1-7).
EPO Application 18 725 358.8 Examination Report dated Sep. 22, 2021.
EPO 21186570.4 Extended Search Report dated Oct. 29, 2021.

\* cited by examiner

THREE-DIMENSIONAL PERCEPTIONS IN HAPTIC SYSTEMS

RELATED APPLICATION

This application claims the benefit of the following four U.S. Provisional Patent Applications, all of which are incorporated by reference in their entirety:
1) Ser. No. 62/370,522, filed on Aug. 3, 2016;
2) Ser. No. 62/370,786, filed on Aug. 4, 2016;
3) Ser. No. 62/370,865, filed on Aug. 4, 2016; and
4) Ser. No. 62/397,419, filed on Sep. 21, 2016.

FIELD OF THE DISCLOSURE

The present disclosure relates generally to improved techniques for perception of simulated three-dimensional objects and generation of three-dimensional sound in haptic-based systems.

BACKGROUND

A continuous distribution of sound energy, referred to as an "acoustic field" may be used for a range of applications including haptic feedback in mid-air. Such an acoustic field may be produced from a transducer array having known relative positions and orientations. In this acoustic field, one or more control points may be defined. Such control points may have a known spatial relationship relative to the transducer array.

These control points may be assigned an amplitude and then amplitude-modulated with a signal and as a result produce vibro-tactile feedback in mid-air. An alternative method to produce feedback is to create control points that are not modulated in amplitude and move them around spatially to create "spatio-temporal" modulation that can be felt.

These control points are effectively concentrations of ultrasonic energy, and moving them around generates disturbances in the air. By spatially modulating these disturbances created by ultrasonic foci, simply moving them backwards and forwards, it is possible to generate low frequency sound through the principle of acoustic radiation force as the focus pushes on the air or other materials around it.

Furthermore, very sudden disturbances are created when such focus points are quickly created or destroyed without slowly increasing or decreasing the amplitude. This creates pops or clicks which are often an unwanted side effect. Moving the control point can be used to achieve similar effects to changing the amplitude, but without the sharp changes in pressure that cause pops and clicks. This means that moving the control point is much more preferable than changing its amplitude. Due to the speed of sound being generally faster than the control point motion, this enables any generated pressure imbalances to dissipate, so the control point may be moved quickly without creating powerful air disturbances.

When considering the intersections between human hands and virtual objects, each finger and the palm in many instances feel a very small part of the overall shape that go towards the appreciation of the whole. Thus, when the hand feels a small part of the shape intersection the whole shape intersection must be created in order to not create and destroy the necessary control points. If the control points were created and destroyed such that they provide only the small part of the intersection, this would create unwanted noise. A more economical method of describing a shape therefore would save power and time and would then enable more of the power expended by the device to be used in creating haptic feedback in places which are touched by a hand.

Due to cross-modal and other perceptual effects, the induction of touch sensations through mid-air haptics remains surprisingly effective at communicating the existence, geometry and surface properties of objects. Fundamentally, although much research concentrates on exploration through touch alone, the effective use of these system is primarily used and driven through systems that cross multiple sensory modalities to provide an experience. For this reason, there exist in practice simple but conceptually complicated effects that can only be achieved through the realization of these underlying principles.

Furthermore, with mid-air haptic devices, virtual objects may be theoretically recreated in mid-air for the user to touch. But due to the nature of mid-air feedback, some fundamental physical limitations exist. This is because there are some parts of the somatosensory system that cannot be directly manipulated by the device, for example thermoreceptors for temperature sensing. But finding an optimal method to map output from the device—which necessarily has strengths and weaknesses peculiar to mid-air haptics—onto simulated physical interactions with virtual objects has been difficult. It is therefore valuable to develop an approach that is readily accepted by a human as corresponding to a plausible interaction with the object. Similarly, it is useful to manipulate focus point spinning in the air to generate a sound wave each time it moves along a path.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The solution described herein involving touch and aural interactions with virtual objects has properties that may be used in combination or separately.

I. CURVE MANIPULATION FOR 3D-SHAPE REPRODUCTION

When a hand intersects the shell of a three dimensional simulated shape, the current solution is to find a closed curve that best represents the intersection that is to be described to the user and actuate that path. Since it is a closed path, the system may use a single control point moving along the path with a given speed (and thus frequency) in order to produce it in mid-air haptics without much noise being created. But this suffers from two important limitations. First, only shapes containing paths that can be conveniently interpreted as closed curved contours may be represented. A shape containing open contours is not as suitable for haptic representation although the path can be bent back upon itself, this changes the haptic effect. Second, if the constraint of a single control point is imposed (since each control point requires computation, it is prudent to use them sparingly) only one contour may be used. If one contour is effective at providing feedback for one finger and another contour is effective for the palm, both cannot be used without recourse to multiple control points, which would split the capacity for output from a given device to provide multiple points of feedback. These drawbacks are in addition to the power limitations of the single contour approach. As the length of the contour increases, the speed that the point moves increases the point become spread more thinly, eventually decreasing its effective haptic response.

Instead of taking a single contour, finding the set of all intersections with the parts of the user on which the haptic effect is to be elicited, as line or curve segments or surfaces is the best solution. But this would involve creating many open curves, and thus entail creating and destroying the point many times at each beginning and end point respectively. Alternatively, this would require using many control points in order to create separate haptic effects for each intersection so that each region of haptic feedback may stay spatially locked. For example, in the specific case of a hand intersection, each finger and potentially also the palm must have separate haptic effects. This requires many points of contact, but so that the each control point may stay local to the point of contact or intersection, the existing solution is either loud (creation and destruction of a single point) or costly in device power and compute (many points). To overcome this requirement for multiple disconnected paths, taking the set of all intersections and then optimizing for the single shortest path that traverses each of them is much more effective. But this action will move across the shape in a linear fashion with a beginning and an end, which will create a control point at the beginning, traverse the shape and destroy the control point at the end, before recreating it at the beginning of the shape. This continuous creation and destruction, although an improvement, remains incompatible with a quiet system.

By connecting the beginning and end of the curves into a single closed curve and traversing it at the appropriate speed the desired haptic effect can be generated with significantly reduced noise. Further, this does not preclude amplitude modulation of the points as they traverse the given curves. This path is illustrated in FIG. 1.

Figure 1:
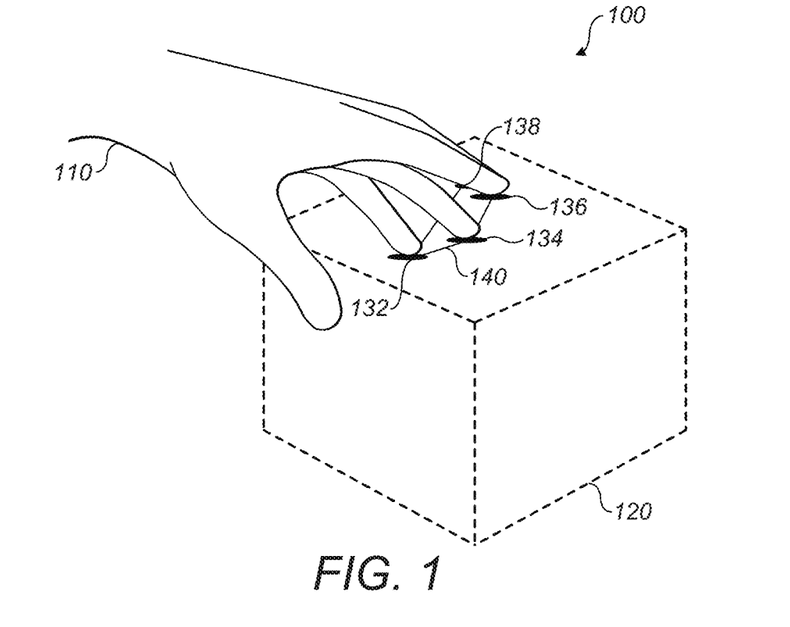
FIG. 1 is a representation of a hand interacting with a virtual cube in accordance with some embodiments.

Shown in FIG. 1 is a model 100 of a hand 110 interacting with a haptically generated virtual object 120. The points 132, 134, 136, 138 where the hand touches the virtual shape are connected into a path 140, and this path 140 is actuated, creating the feeling while moving the focus smoothly. Smooth movement of the focus along the path 140 without interruption minimizes any unwanted audible noise, resulting in correct, strong haptic sensation across multiple fingers while operating quietly. In addition, although FIG. 1 shows a hand 110, any body part may be used.

Because the curve connects each curve segment, the system determines whether to traverse them in a preset clockwise or counterclockwise motion. This motion is relative to a normal vector which may be defined relative to the user (such as a local coordinate space relative to the geometry of their hand), intersections or the geometry. Alternatively, it may be useful to use points traversing multiple curves in order to provide feedback for more than one user or hand.

One drawback of this approach is that in order to close the curve the user himself/herself must be avoided, in order to prevent spurious haptic effects being created on the user at locations where intersections did not occur. To achieve this in the context of the users' hand, the curve should be either made to go over or under the hand (and thus defocusing at the location of the hand) or around the hand. Alternatively, the state space of the transducers may be interpolated between each endpoint, removing the need to find a spatially coherent approach to closing the curve. The state of the ultrasonic waves in the acoustic field is driven linearly by the complex valued activation coefficients of each transducer. This requires, grouping all of these complex values for all transducers into a high-dimensional phase space and linearly interpolating between a first state in the space (that represents, for instance, an end point on one curve) and a second state (that represents an initial point at a different location). The linear interpolation must also apply to the acoustic fields resulting from the actuation of the newly created states in the intermediate stages. It should be noted that in these intermediate stages between the two states, the control point does not necessarily have any particular location. But because the linear interpolation applies to the produced acoustic field, the field must smoothly vary in time and therefore also could serve to also greatly reduce audible output while achieving the movement between points.

Another potentially more compatible approach is to change the speed at which the control point is moving along the curve. To start, the solution computes the length of the curve required to complete the closed path, traversing each intersection curve segment in turn creating haptic effects at each intersection with the user. Next, first considering only the parts of the path that do not contribute to the haptic effects, the solution traverses these haptically unnecessary curves at the fastest possible speed to avoid wasting power on them. This reduces the haptic actuation of these curves and is beneficial in two ways. First, the amount of time taken to traverse these parts of the path is reduced; second, if the user is intersected in error during this time the amount of haptic effect that he/she would receive would be minimal. Nevertheless, in the limit of this technique, it will behave as creation and destruction of the control point, creating pops and clicks as before. For this reason, it is useful to consider a speed limit that lessens the effects generated by discontinuities between the states of the acoustic field. The result of this technique is to create a control point that accelerates and decelerates between haptic regions. By considering a curve harboring haptic effects in this way, there may be the requirement that the curve must cycle at a haptically active frequency. This has the effect of creating a time "budget" of a closed path cycle period, part of which may be spent on the haptically active parts of the path and the remainder used to reduce audible noise. In this light, the remaining time in the haptically-actuated curve length is split between the parts of the path that require haptics. This time "budget" must ensure that these intersections receive as much of the energy from the array as possible so that haptic effects have the time (and thus power) to be realized at the intersections with the user. In this way, the device may be quiet and behave in a fashion that maximizes the energy deposited on the parts of the user to be haptically actuated such as the fingers.

Another issue is that the virtual shape or user position may dynamically change while haptic effects are being produced. For example, at the current time $t_0$ a closed curve containing haptic effects is in current use. At the next time step in the future $t_1$, a new curve containing haptic effects is synthesized to reflect the changes in the virtual shape. In this case, a further curve must be plotted that allows the point to traverse from the old curve representing the state of the virtual and physical world at time $t_0$ to the new curve representing the state at time $t_1$ without discontinuity. Selecting the closest point on each curve, and constructing a path between them that allows the point to move from the $t_0$ curve to the $t_1$ curve may be used to achieve this. This may also benefit from the introduction of a speed limit similarly to the unactuated portion of the haptic path described previously to limit the unusable traversal time from one curve to the other.

II. TOUCHING VIRTUAL THREE-DIMENSIONAL OBJECTS

A. Introduction

This disclosure is related to a system where a user interacts with virtual 3D-content by a tracking system monitoring his/her hands, using a physics engine to update the position and properties of the virtual content, and a haptic feedback system providing haptic information to the user. The haptic system may be mid-air haptic feedback. A haptic impulse may be applied to the user when his or her hand contacts a virtual object. This impulse may be applied at the exact location of the contact. Or the user's hand is formed into a skeletal model and the impulse is applied to each bone in the skeleton that contacts the object.

The strength and duration of the impulse is adjusted based on output from the physics engine, including momentum and physical properties of the hand and virtual object. The waveform of the haptic impulse may be adjusted based on the above physics engine outputs. A weaker haptic sensation may be applied to parts of the hand when the object is released or when contact with it ceases. In contrast, there is no haptic feedback applied during continuous holding.

Haptic feedback may be applied to the opposite side of the hand to which the contact is occurring. And haptic feedback follows the hand for the decaying amplitude experienced after contact.

B. Interacting with 3D Objects

A system may have a user who interacts with virtual 3D-content by a tracking system monitoring his/her hands, using a physics engine to update the position and properties of the virtual content, and a haptic feedback system providing haptic information to the user. The haptic system may use mid-air haptic feedback. A haptic impulse may be applied to the user when his or her hand contacts a virtual object. This impulse may be applied at the exact location of the contact. The user's hand may be formed into a skeletal model and the impulse is applied to each bone in the skeleton that contacts the object. The strength and duration of the impulse may be adjusted based on output from the physics engine, including momentum and physical properties of the hand and virtual object. The waveform of the haptic impulse may be adjusted based on the above physics engine outputs.

A weaker haptic sensation may be applied to parts of the hand when the object is release or when contact with it ceases. Furthermore, there may be no haptic feedback applied during continuous holding. Haptic feedback may be applied to the opposite side of the hand to which the contact is occurring. In addition, haptic feedback follows the hand for the decaying amplitude experienced after contact.

Specifically, when a user is engaged in virtual reality that has been enhanced by the addition of a mid-air haptic device, a hand tracking system may be employed to track their hands in order to determine the position and orientation of each hand, finger and joint. This information can be input into the virtual world in the form of a virtual hand object that is capable of interactions with virtual objects, albeit only one way. This is because the physical hand has one-to-one correspondence with, and puppets, the virtual hand. The virtual hand has the ability to interact with virtual objects, generally through some form of physics engine. (A physics engine is understood as one of the components of a game engine.)

For rigid bodies that do not change shape, a physics engine will generally be responsible for managing the simulated forces and torques applied to the objects in the virtual world and the resulting changes in linear, and angular, velocity and acceleration, before generating the corresponding changes in spatial transformation for each object or object part represented. Other object types may imply additional management or information, and may also include more complex simulation of physical phenomena.

Nonetheless, fundamentally, interactions between virtual objects are mediated by their simulated forces and torques, which must be found before these interactions can be simulated. In order to find these simulated forces and torques, the physics engine will ensure virtual objects are tested for "collisions", which is effectively testing for future situations in which objects in the virtual scene might intersect. This generates collision information which feeds the management portion of the physics engine with positions, velocities, forces and torques. This information can also be used to inform a haptics engine about what a user might feel if parts of the user extended into the virtual world. But this machine is unable to affect the physical user due to the virtual objects not being able to physically collide with the user. In the case of the users' hand, the virtual objects do not affect the virtual hand and thus physical hand. This disconnect causes a loss of immersion in the virtual world.

A satisfying experience results if the mid-air haptic device is configured to provide feedback to the user at the point at which an impulse (a short sharp force, during which the force changes in time sharply), contact or similar interaction in which the force changes sharply in time is applied to the virtual object by the user, or on the virtual representation of the user by the virtual object. A haptic impulse that mirrors this may be created by generating a similarly short haptic effect. This is effective because of the occurrence of an illusion of two-way interaction due to the cross-modal effects in play at this setting. This haptic impulse may then be adjusted using the trajectory of the object and the hand, along with the simulated momentum, restitution and other physical properties of the object and hand.

The feedback may then be applied with an intensity and waveform appropriate and proportional to the impulse applied. Due to the proprioceptive and cross-modal phenomena in effect in this situation, in the case of the users' hand, the closest addressable part of the hand may be used (including through the hand). The user will still perceive this haptic effect to be originating at the location of the collision.

Thus, if the impulse occurs on the back of the hand, due to the relative vibrotactile receptiveness of glabrous skin on the opposite side of the hand, this other side would be actuated instead of the real location of the contact. Perceptual effects then cause the user to believe that the impulse was stimulated in the correct location.

In addition, the user in a virtual world may want to pick up virtual objects. Since picking up and dropping objects is a common activity, it is important to preserve the user experience through this process. When picking up an object, the user receives impulses corresponding to the grip placed on the object. During the grip time, no feedback is applied. When the object is released or dropped from the users' virtual grip, a reduced impulse is used to indicate that the object has been released.

In many cases, the feedback follows the part of the hand to which the impulse was directed since it is modelling the vibration of and subsequent haptic effect on the skin at the point of contact. The feeling on contact can be accentuated, potentially using a decaying amplitude on the point of contact on the hand, to create a more persuasive effect and overcome the short duration of each impulse. The duration of the impulse may also be driven by data from the physics engine.

III. SPATIO-TEMPORALLY MODULATED SOUND

A. Sound from Ultrasound Via an Alternate Mechanism

The noise generated from certain haptic-based interactions is often an unwanted side effect of the haptic activity. But it is possible to use the property of noise generation to produce desired sound effects. Precisely controlling disturbances in haptic systems that generate low frequency noise provides the capacity to generate broadband signals by spatially moving the focusing points. This enables the creation of sound from ultrasound using an entirely different mechanism from existing parametric audio applications. Rather than modulating a point or beam in amplitude, a control point may instead be moved in a trajectory that encodes the waveform. This turns the control point into an audio source.

B. Plotting Spatial Trajectories

Figure 2:
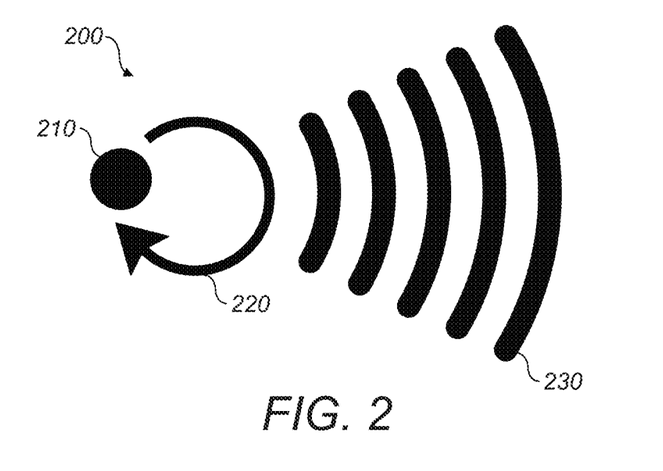
FIG. 2 is a representation of a control point moving in air that generates sound waves in accordance with some embodiments.

Turning to FIG. 2, shown is a representation 200 of a focus point 210 spinning in the air via, path 220, which generates a sound wave 230 each time it moves along the path 220. The motion can be modified to reproduce a sound that is audible to the human ear in a localized way without amplitude modulating the focusing system.

The easiest way to generate these trajectories is to take an existing sound source and reinterpret it as a linear path along which a focus point moves to create a sound wave. At each point in time, the level in a digitally sampled sound channel may be interpreted as a parameterized position along this path that the focus is to be created. By creating foci at these positions at the sampled time offsets, an audible sound can be created along a 1D open curve path.

Alternatively, such an existing digitally sampled sound source may be decomposed into in-phase and quadrature components, that is into the real and imaginary parts of a complex signal that describes the audio. This is not trivial for an audio source since it is wideband. Thus, the most effective way to achieve the desired result is to apply a Fourier transform to the signal and apply a $\pi/2$ phase offset. The standard approaches concerning windowing, blocking of the signal and transitions in phase may also be used. This generates the imaginary component of the sampled audio signal. Since the signal may be represented as a complex value, the signal may be mapped onto a 1D closed curve, or a 2D circle, plane or surface. Moving the point around or remapping these 2D coordinates into the space will produce sound waves, thereby recreating this audio signal. In this way, the audio signal may be generated in a 2D area.

This effect may also be used in a third dimension to provide the phase cues that govern stereo audio (potentially with a single sound source) for systems that cannot create strong foci in disparate positions. Similarly, for multiple focus points, multiple sound sources may be synthesized. This enables multi-channel audio that can be created from focus points in the air. These focus points may also provide haptic feedback.

IV. GENERATIVE HAPTICS FROM AUDIO EXEMPLARS

Control points may be changed in amplitude many thousands of times a second, although only low frequencies can be detected as haptics. Through non-linearity effects, higher frequencies can be reproduced. Updating the control points quickly yields the ability to produce many frequencies at once, giving the ability to reproduce audio in some sense. However, audio does not have information in frequency ranges that are haptically effective.

Designing haptic effects in the air is challenging as due to the sensitivity of the skin only some bands of frequencies are available for haptic use. Due to this, effects can be created that create pleasurable sounds from the array that do not convey haptics and conversely haptic effects that do not sound pleasing. Due to these reasons, an easier approach to designing mid-air haptic effects would be valuable.

Creating a haptic sensation using a sound as input may be achieved in a number of ways. The frequencies of the sound that are in the haptic range may be amplified until a haptic threshold is reached. Alternatively, the initial sound may have frequencies that are haptically active added to it. The original sound may be analyzed and a profile constructed. This profile may then be used to generate a haptic effect. This may be constructed using the qualities present in the sound, allowing the created haptic texture to take on aspects of the exemplar such as speed, rhythm or texture. The sound may be processed into a haptic effect using a variety of processing mechanisms. These mechanisms may be configured to emphasize certain aspects in the resultant haptic effect while potentially ignoring others. This can also be achieved by extracting a feature set from the sound before processing the sound into a haptic effect. A feature set could also contain discontinuities inferred from the sound, such as for example a plosive phoneme being interpreted in this way.

Specifically, this can be implemented by (1) extracting a feature set from a sound profile before assigning the plurality of amplitudes to the control point over a preset time period; and (2) applying a feature set to the plurality of amplitudes assigned to the control point over a preset time period. Alternatively, it can implemented by (1) extracting a feature set from the plurality of amplitudes to the control point over a preset time period; and (2) applying the feature set to the sound profile.

A library of haptic effects may be searched and sorted based on the extracted feature set alongside similarity metrics in order to provide feedback to a haptic author. This haptic author may use the sound interface to describe basic components of a haptic effect, which can then be edited and mixed further. The haptic effect may also be mixed back into the waveform, resulting in a combination of audio and haptic effects. This may occur automatically or via a range of processing styles. These may involve accentuating or augmenting particular haptic effects in order to stylize the effects. The processing styles may be concatenated or remixed to create new processing schemes. Labels can be attached to these processing mechanisms and haptic effects, such as "buzzy" or "warm". These may be used to adjust existing haptic effects, adjust audio inputs to be synthesized into haptic effects or search for existing effects that are examples of the style described.

V. CONCLUSION

The various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
    producing an acoustic field from a transducer array having known relative positions and orientations;
    defining a control point wherein the control point has a known spatial relationship relative to the transducer array;
    assigning an amplitude to the control point;
    generating a mid-air haptic effect for a user by traversing the control point in a closed curve using smooth movement without interruption to minimize unwanted audible noise, wherein the single closed curve comprises a plurality of curve segments.

2. The method as in claim 1, wherein the closed curve is traversed relative to a normal vector defined relative to the user.

3. The method as in claim 1, wherein the closed curve comprises multiple curves to provide feedback to multiple users.

4. The method as in claim 1, wherein the closed curve is defocused at a user's location.

5. The method as in claim 1, wherein traversing the control point in a single closed curve comprises:
    computing a length of the closed curve required to complete a closed path;
    for each of the plurality of curve segments, creating additional haptic effects at each intersection with a user;
    for the plurality of curve segments that do not contribute to the haptic effects, traversing the control point at a faster speed.

* * * * *